Dec. 24, 1968 E. R. BETZOLD ET AL 3,417,658
EMPTY CASE EJECTOR MECHANISM
Filed July 31, 1967 12 Sheets-Sheet 1

INVENTORS
Edward R. Betzold
Carl T. Johnson
ATTORNEY

Dec. 24, 1968 E. R. BETZOLD ET AL 3,417,658
EMPTY CASE EJECTOR MECHANISM
Filed July 31, 1967 12 Sheets-Sheet 7
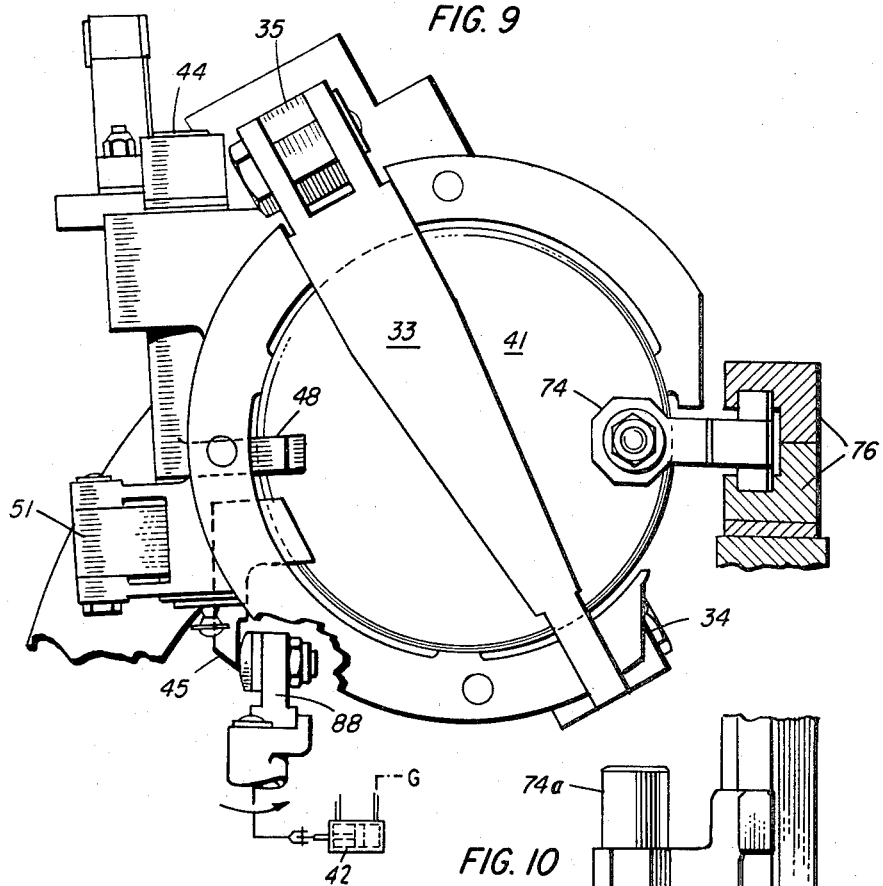
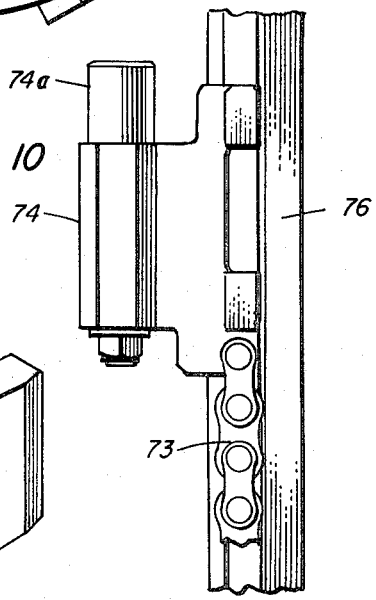
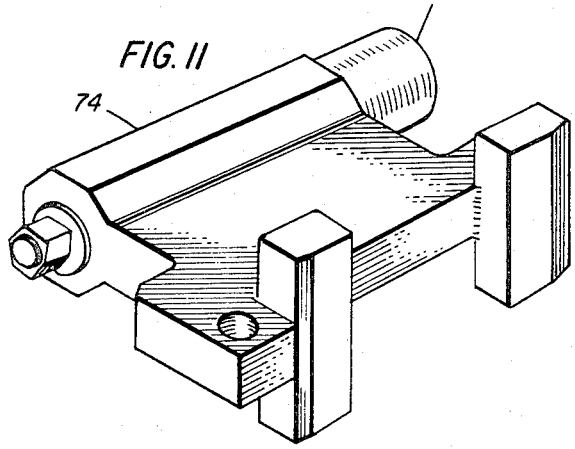

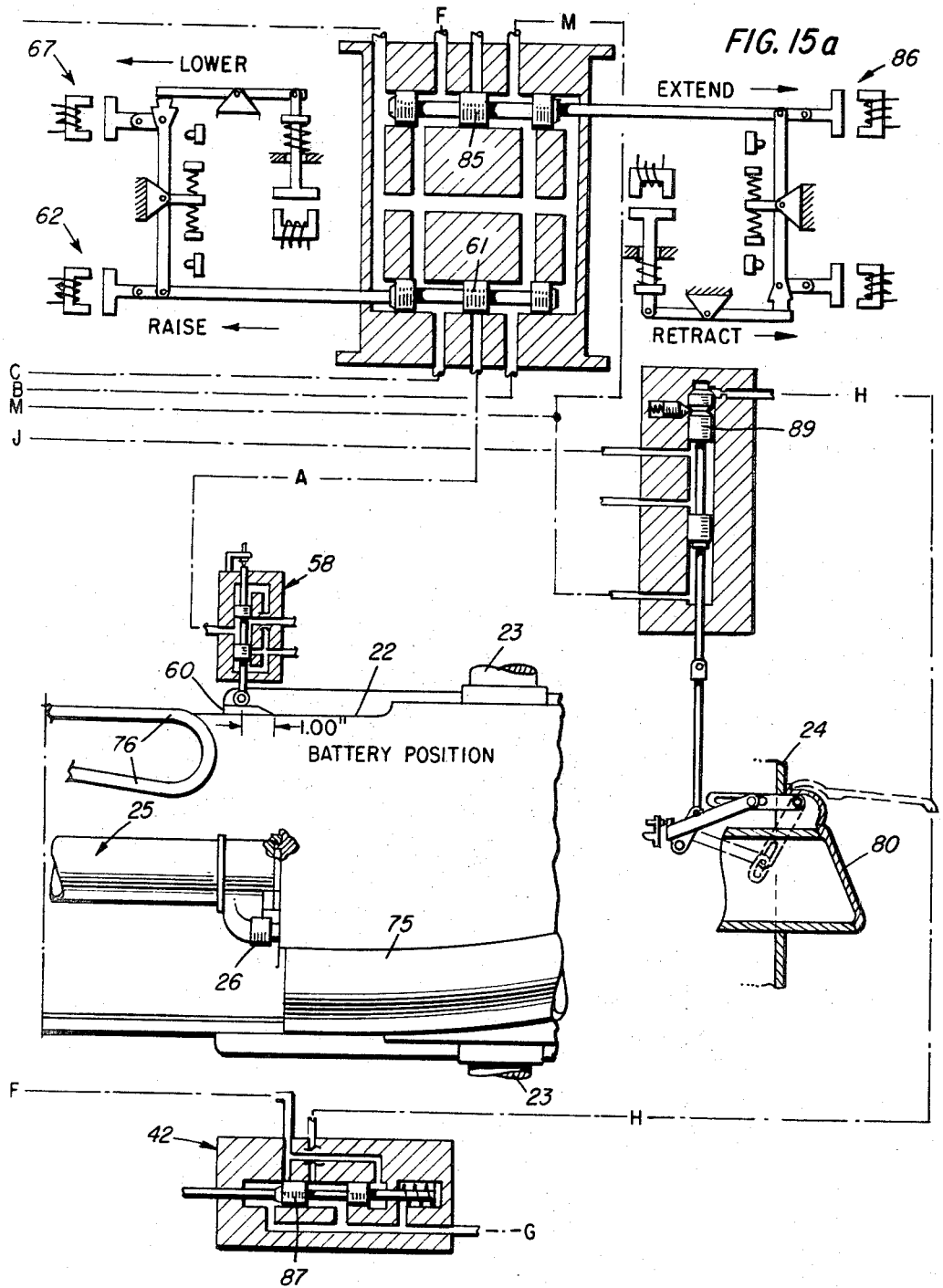

Dec. 24, 1968  E. R. BETZOLD ET AL  3,417,658
EMPTY CASE EJECTOR MECHANISM
Filed July 31, 1967  12 Sheets-Sheet 10
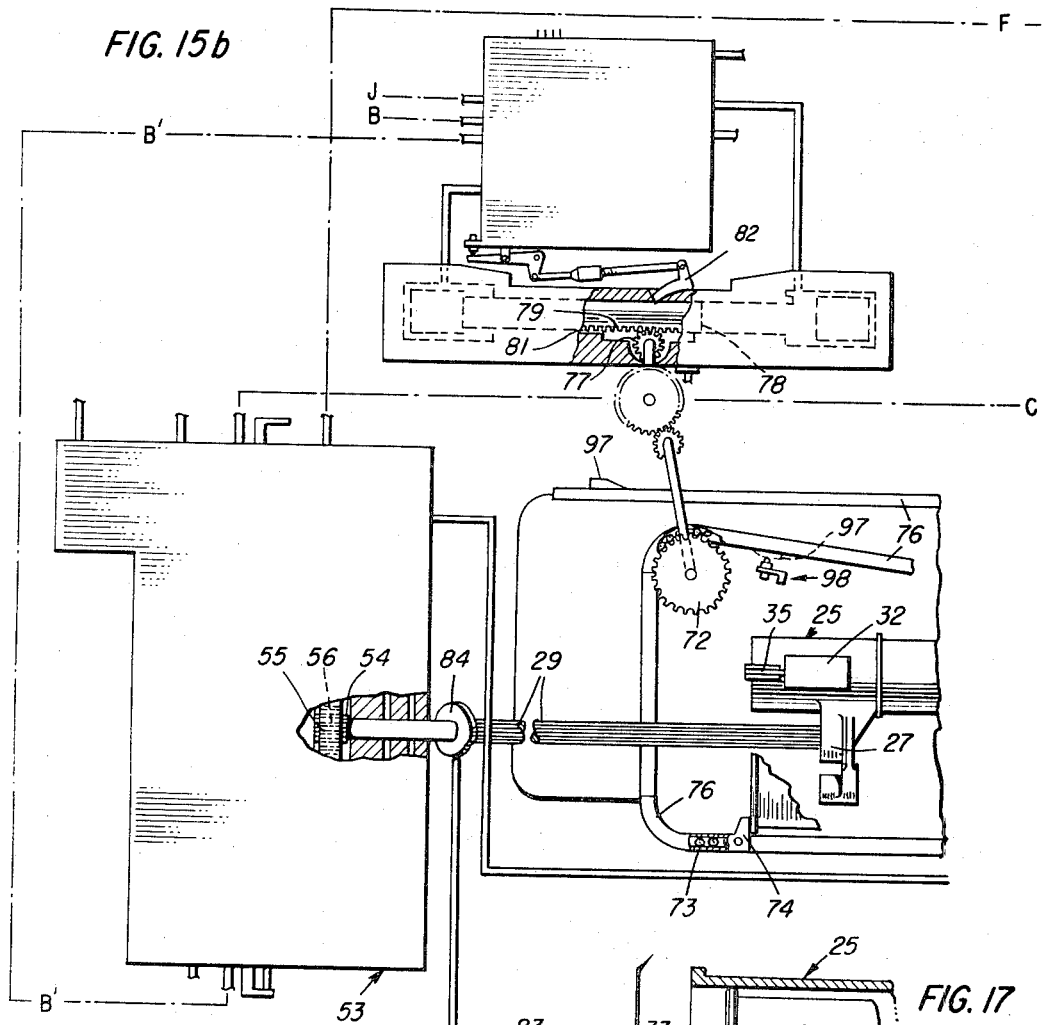
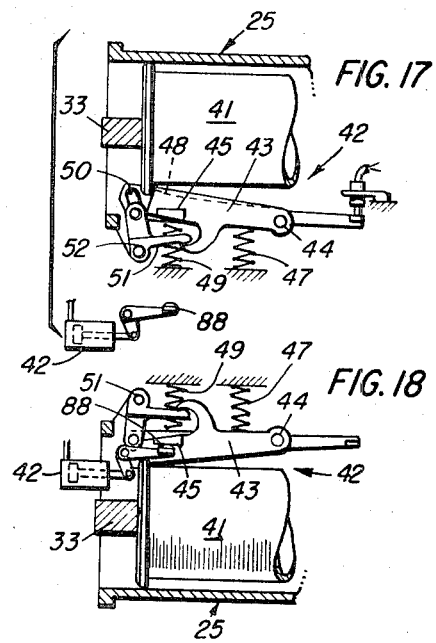
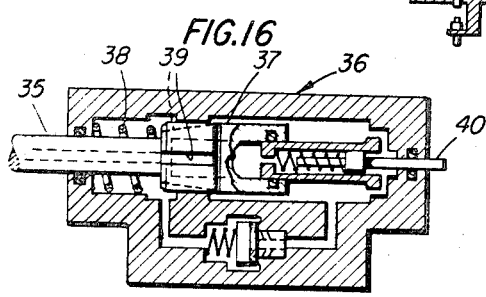

United States Patent Office 3,417,658
Patented Dec. 24, 1968

3,417,658
EMPTY CASE EJECTOR MECHANISM
Edward R. Betzold and Carl T. Johnson, Minneapolis, Minn., assignors, by mesne assignments, to the United States of America as represented by the Secretary of the Navy
Filed July 31, 1967, Ser. No. 658,310
8 Claims. (Cl. 89—33)

ABSTRACT OF THE DISCLOSURE

An empty case ejector mechanism including an empty case tray which recoils as a unit with the gun housing and receives the spent powder can extracted during the counter-recoil of the gun. After the powder can is latched into the tray, an empty case tray drive rotates the tray through an arc of about 180° to position the can in alignment with the empty case ejector. A chain is activated to push in a single motion, the empty case from its tray, down a chute, and to the outside of the gun mount shielding.

BACKGROUND OF THE INVENTION

This invention relates generally to major caliber guns with calibers of the order of magnitude of five inches or greater, preferably employing separate or semi-fixed ammunition and intended to be effective for both anti-aircraft and surface fire. More particularly, the invention relates to an empty case ejector mechanism for automatic gun systems.

The gun structure in which the instant invention may be practiced, is generally one which is fully automatic in its loading operation, with appropriate means being provided to insure the proper sequence of operation and to prevent injurious cycling of the system. A like automatic system for the removal of the spent ammunition cases from the gun after firing, therefore, becomes gravely important.

Heretofore, discharge means were provided such that, during operation of the gun, the empty powder can would be removed from the breech block by an empty case extractor during recoil, constrained in an empty case tray, and ejected therefrom by an empty case ejector. Consequently, in a gun which fired both high and low velocity ammunition, it was required that the empty powder can be expelled with sufficient velocity to span the gap between the breech face and the empty case tray and an adjustment be made to assure that the recoil distance was sufficient, when firing low velocity ammunition, to trigger the empty case extractor. This invention improves upon these existing discharge mechanisms by obviating the need for any refinement or readjustment on an automatic gun capable of firing both high and low velocity ammunition.

SUMMARY OF THE INVENTION

The empty case tray mechanism herein, is unique in that it has been designed to latch onto and recoil with the gun housing thereby allowing it to recoil as a unit with said housing, and receive the powder can extracted during the counter-recoil cycle of the gun. As the gun again approaches position after firing and recoil, and after the powder can is latched into the tray, the empty case tray is rotated through an arc of approximately 180° for positioning of the powder can in alignment with the empty case ejector. In general, the assembly for this phase of the operation consists of an empty case tray, operating piston, and control valves, which may be operated by an hydraulic pressure of 1550 pounds per square inch from an upper accumulator system. After the empty powder can has been raised into position in its empty case tray, the empty case ejector moves the powder can in a forward direction and ejects it out of the gun shielding through an empty case door located in the gun port shield. Generally, this is accomplished by means of an hydraulically operated piston, a control valve block, a gear and sprocket drive, a chain and pawl, and a guide tube, all of which are located on the top side of the gun housing and may be operated by 1550 p.s.i. hydraulic pressure from the upper accumulator system.

In light of the foregoing, it is an object of the present invention to provide an empty case ejector mechanism capable of use in gun systems firing both high and low velocity ammunition.

Another object of this invention is to provide an empty case ejector means which will receive the spent cartridge from the gun bore in an automatic gun system, and will thereafter discharge said cartridge through the gun shielding.

A further object of the present invention is to provide an empty case tray mechanism, in an automatic gun system, capable of receiving the empty powder can from the gun breech while latched thereto, and thereafter rotate the powder can into a position of alignment with the empty case ejector for expelling the powder can through the gun shielding.

A still further object of the instant invention is to provide an empty case ejector which, when actuated, will completely discharge the empty case through the gun shielding in one moving cycle, through an aligned discharge chute.

Other objects, advantages and novel features of the present invention will become apparent from the following detailed description of the invention when considered in conjunction with the accompanying drawings.

BRIEF DESCRIPTION OF THE DRAWINGS

FIG. 9 is a rear view of the empty case tray after being rotated in position for powder can extraction;

FIG. 10 is a top view of a pawl secured to a chain for moving the empty powder can out of the gun mount;

FIG. 11 is a perspective illustration of the pawl shown in FIG. 10;

FIG. 15a is a schematic view of a part of the empty case ejector mechanism and a hydraulic schematic of the latch mechanism, operating door mechanism and solenoid assembly;

FIG. 15b is a schematic view of another part of the empty case ejector mechanism;

FIG. 16 is a section view of the latch mechanism, shown in FIG. 2, in relation to a spent cartridge which is shown in phantom;

FIG. 17 is a schematic illustration showing the powder can latched in the empty case tray while in alignment with the gun bore;

FIG. 18 is a schematic showing of the powder can latched in the tray just before being unlatched for empty case ejection;

DESCRIPTION OF THE PREFERRED EMBODIMENTS

Figure 1:
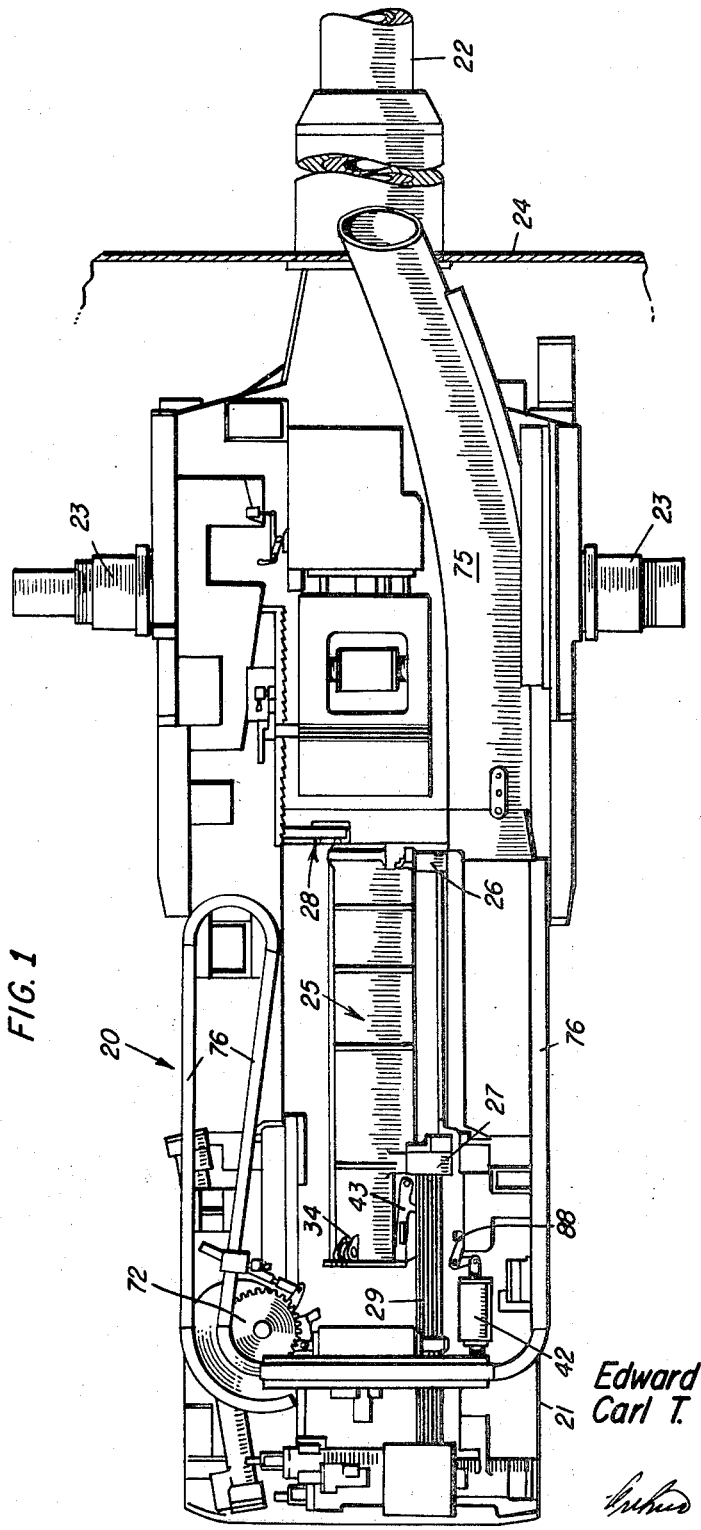
FIG. 1 is a plan view of the case ejector mechanism according to the instant invention showing the empty case tray in alignment with the gun barrel.
Figure 2:
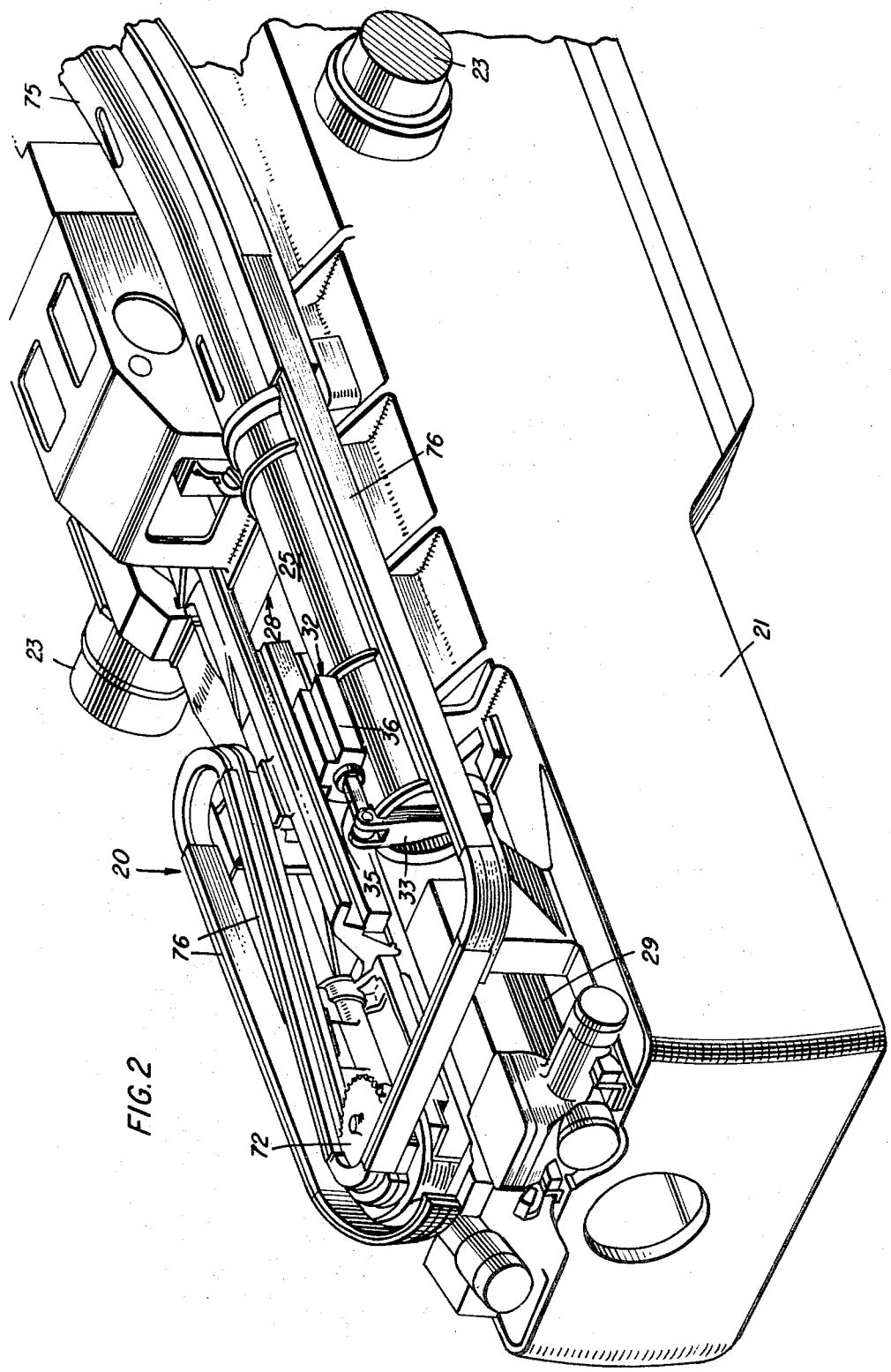
FIG. 2 is a perspective view of the gun's slide assembly on which the empty case tray is shown, in its raised position, in alignment with the empty case chute.

Referring now to the drawings wherein like reference characters represent like and corresponding parts throughout the several views, there is shown in FIG. 1, the case ejector mechanism, generally designated by reference numeral 20, in plan view and, in FIG. 2, in perspective, as mounted upon a slide assembly 21. The invention represents only one phase of a gun mount operation employing guns with calibers of the order of magnitude of five inches or greater. Therefore, only those components necessary to an understanding of the subject design, such as gun barrel 22, trunnions 23, and gun mount shielding 24, in part, are shown. Other vital components of the gun mount, such as the ready service magazine, providing ammunition for the ready service hoist tube, which feeds the shells upwardly in position for reception by the ramming tray, or cradle, are omitted from the application.

Figure 3:
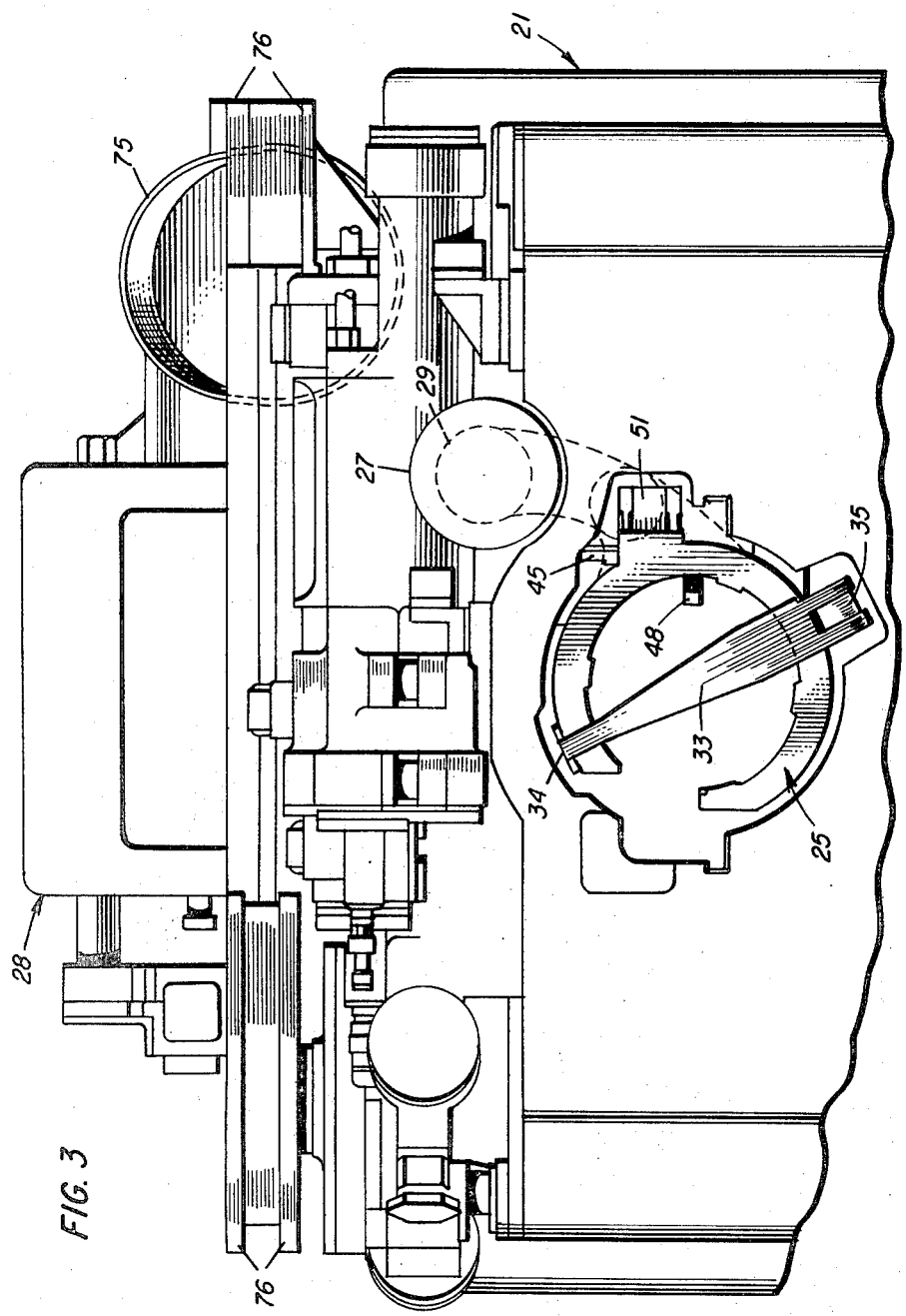
FIG. 3 is a rear view of the case ejector mechanism taken from FIG. 1.
Figure 4:
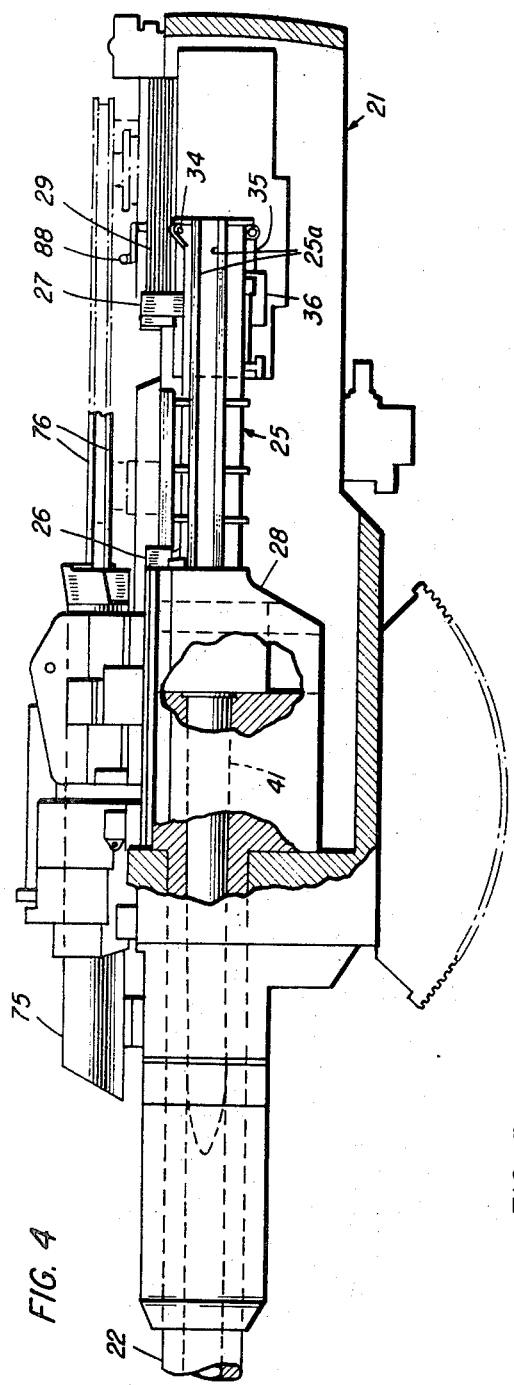
FIGS. 4 and 5 are side views of the gun barrel and slide, partly broken away, showing the empty case tray in relation to the gun housing before and during firing, respectively.
Figure 5:
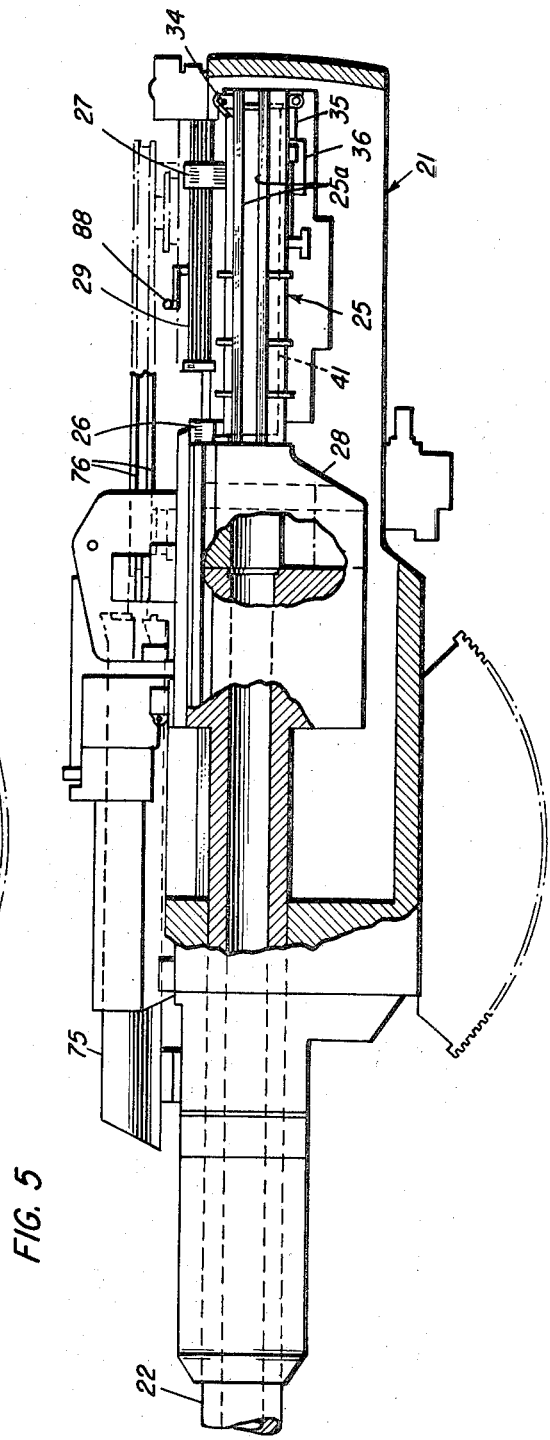
Figure 6:
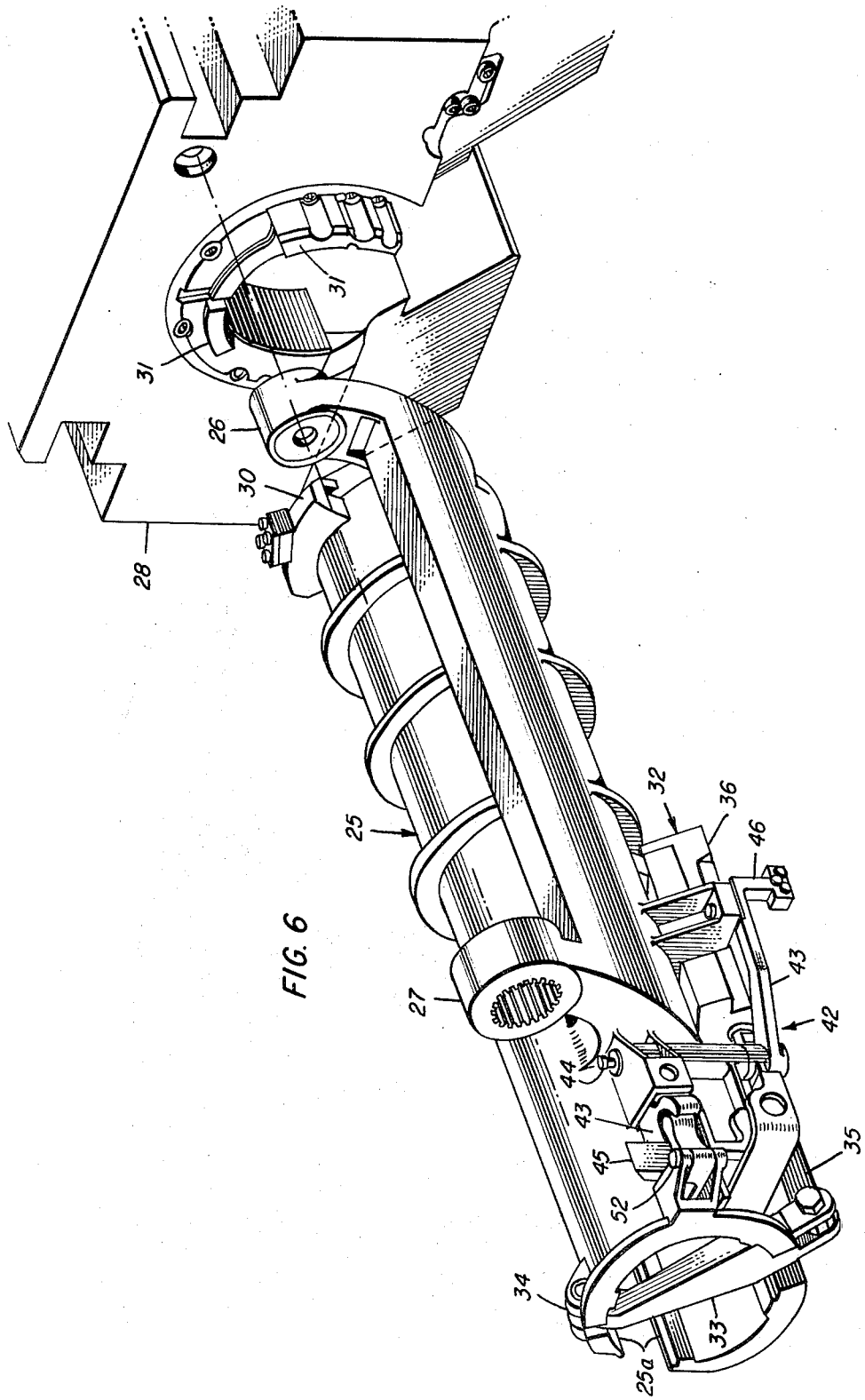
FIG. 6 is a perspective illustration of the empty case tray and gun housing aft portion shown disassembled from each other for purposes of clarity.

The empty case ejector mechanism 20 includes an empty case tray 25 which, as clearly shown in FIG. 6, comprises a hollow tube having two integral arms. The forward arm 26 is attached to a pivot on the aft face of gun housing 28 while the other arm 27, near the aft end of tray 25, serves as a sliding support for the tray, since it slidingly engages with a splined shaft 29, mounted on slide assembly 21, in any conventional manner. Arm 27 also acts to transmit the required lifting torque imparted to shaft 29 for raising and lowering the tray. A detailed description of the means for producing a rotation of shaft 29 will appear later on in the specification. The forward or open end of tray 25 is provided with lugs 30, only one of which is shown, which engage with suitable mating lugs 31 on the gun housing aft face, such engagement to occur when the tray is in alignment with the gun bore, as shown in FIGS. 1 and 3. These lugs serve to transmit the motion of gun barrel recoil and counterrecoil to empty case tray 25 and serve to provide support for the tray during extraction of an empty powder case.

Figure 7:
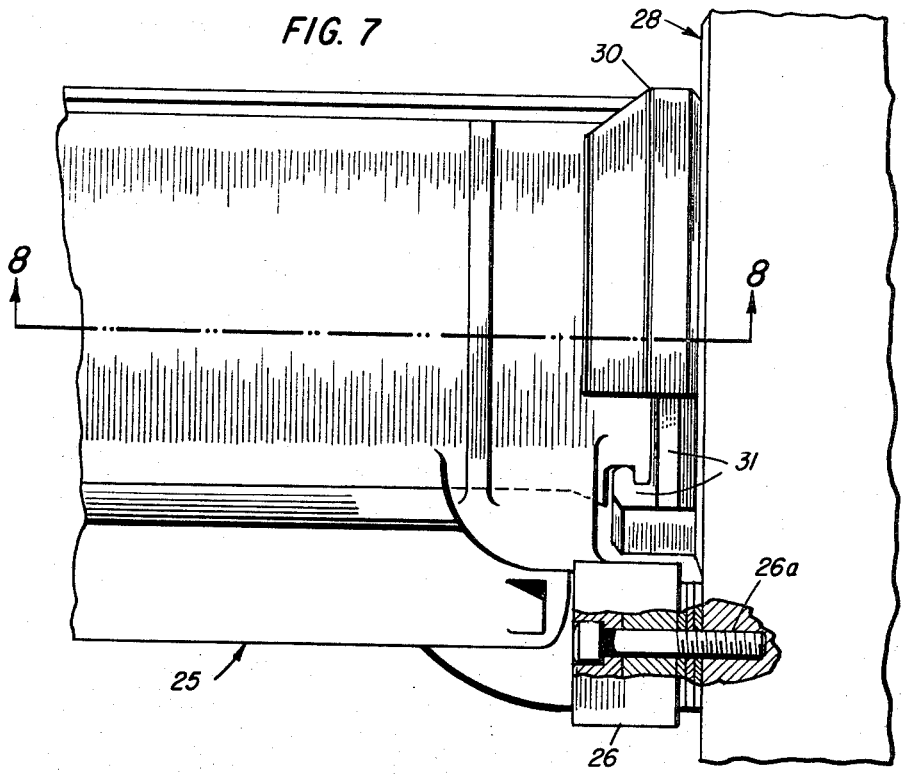
FIG. 7 is a partial top view showing the empty case tray, in detail, latched onto the gun housing aft portion.
Figure 8:
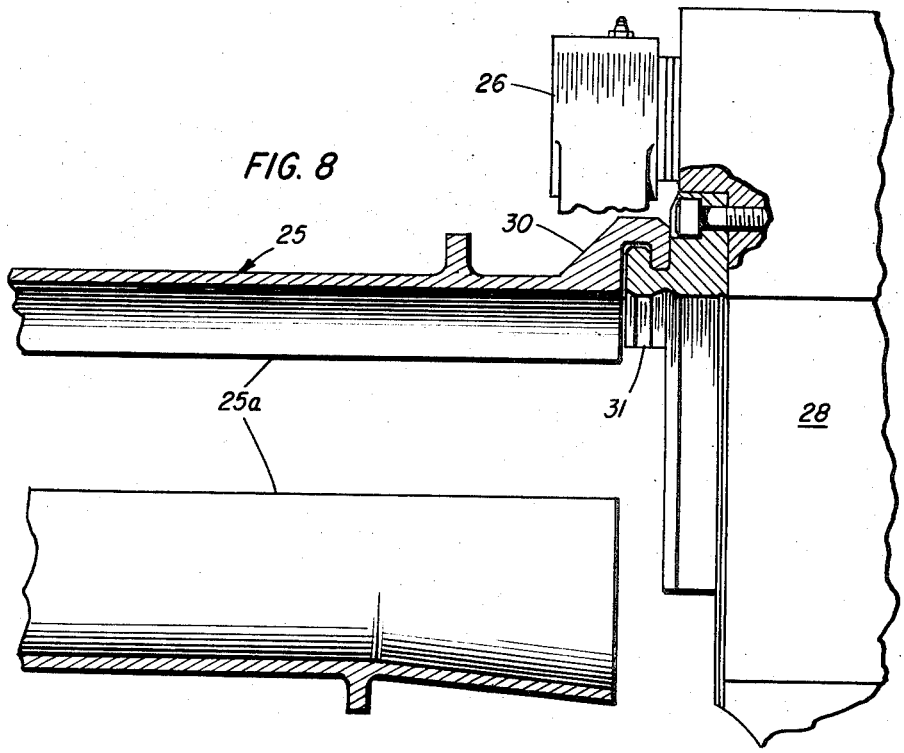
FIG. 8 is a sectional view taken along line 8—8 of FIG. 7 showing, in addition, a portion of the case's pivot arm.

In FIG. 7, tray 25 is shown in engagement with gun housing 28, through mating lugs 30, 31. The forward arm 26 of the tray is shown pivotally mounted to the housing as at 26a. In FIG. 8 of the drawings, the empty case tray is clearly shown as having a slot 25a, longitudinal of the tray, and for purposes to be described hereinafter.

In FIG. 2 and more clearly in FIG. 6, a powder can buffer assembly 32 is shown mounted on the tray 25 at its aft end. Such provides a dampening of the spent powder can after it enters the tray. Assembly 32 includes a crossbar 33 hingedly secured, at one end, to the tray, as at 34. The other end of bar 33 is hingedly affixed to a shaft 35 extending into a housing 36, shown clearly in FIG. 16, and having a piston head 37 at one end thereof. A coil spring 38 within the housing urges piston 37 forward within a fluid filled chamber such that, as the empty powder can 41 strikes bar 33 upon extraction, shaft 35 is drawn aftward causing a displacement of fluid from one side of the piston to its other side via orifice grooves 39 located in the piston diameter. The dampening effect thereby produced allows buffer assembly 32 to receive the impact of the extracted powder can 41 by providing a constant deceleration force to the extracted case. As is evident from the drawing, a check valve, within housing 36, is in communication with ports to either side of piston 37, and has a valve head therein maintained in a seated position by a spring. The check valve and its associated parts act to permit a bypass of grooves 39, as the buffer is returned to its initial position by the buffer spring 38. Shaft 35 may also be provided, as shown, with a bleed port along its longitudinal axis in communication with a suitable opening in the aft face of piston 37. The inner chamber of housing 36 may be replenished with fluid when to do so becomes manifest by indicating valve 40 disposed in the housing, as shown.

Figure 12:
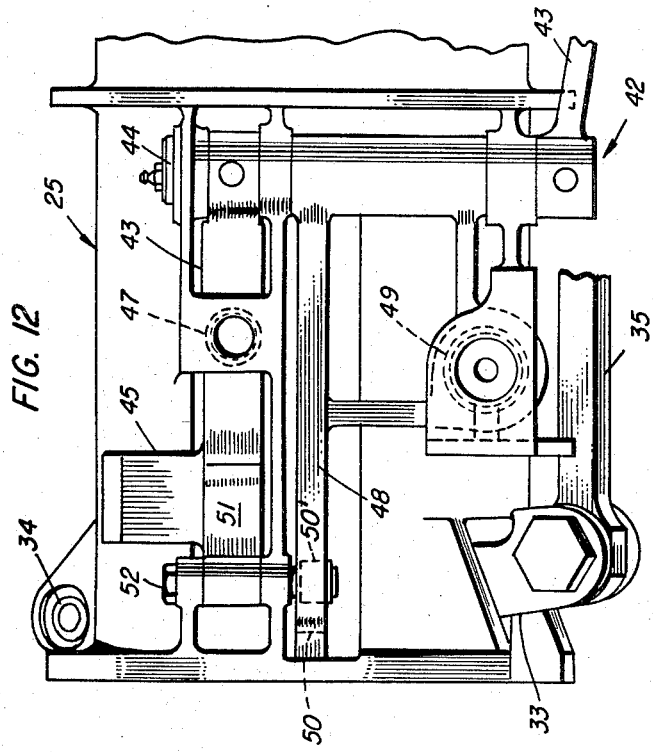
FIG. 12 is a side view of the buffer mechanism and latch mechanism secured to the aft portion of the empty case tray.
Figure 14:
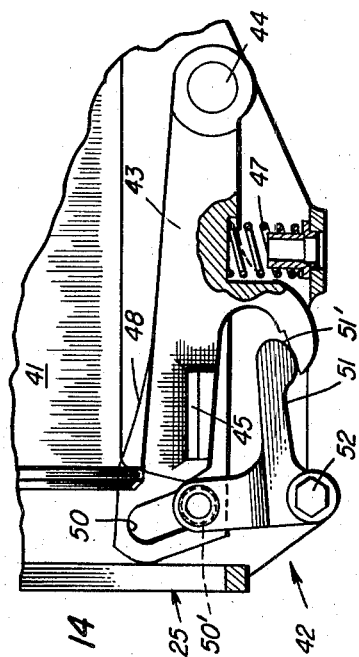
FIG. 14 is a partial side view of FIG. 12 showing the latch mechanism in detail.
Figure 13:
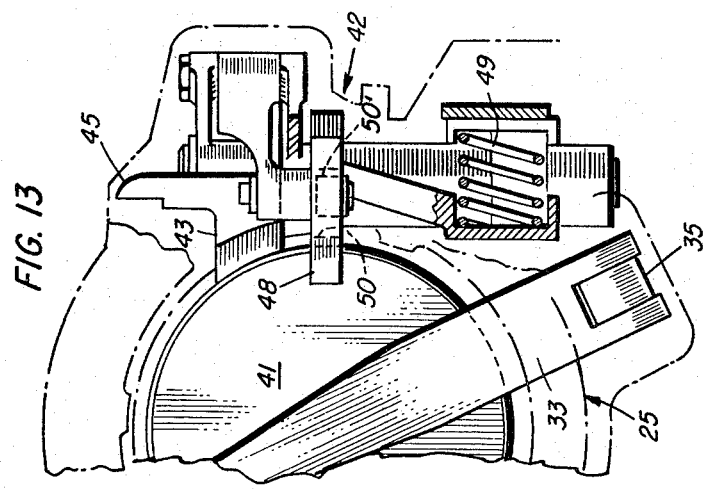
FIG. 13 is a partial end view of FIG. 12.

As the extracted powder can 41 approaches crossbar 33 of buffer assembly 32, an empty case latch assembly 42, shown in perspective in FIG. 6, acts to latch the spent cartridge within the empty case tray until released for empty case ejection. Assembly 42, see also FIGS. 12, 13 and 14, comprises a substantially Z-shaped arm 43 pivotally mounted on the tray as at 44, having a bracket 45 near one end thereof and a switch contact leg 46 at its opposite end. A coil spring 47, FIGS. 12 and 14, resiliently urges arm 43 toward the powder can. Assembly 42 further comprises a latch locking bar 48 pivotally mounted at 44, independent of arm 43, and being resiliently urged toward the empty case by a coil spring 49, FIGS. 12 and 13. Bar 48 is also provided with an offset elongated aperture 50 in which is slidable a roller 50' attached at one end of a yoke 51. Yoke 51, pivotally secured at 52 and having an opposite end 51' in engagement with latch 43, is prevented from rotary movement by the angular position of the slot 50 in the bar 48. Upon movement of the can 41 past a cammed edge of bar 48 causing movement thereof, the angular slot 50 will be so positioned as to allow counterclockwise movement of yoke 51 thus allowing free movement of latch 43. As the can is buffered by arm 33 of the buffer assembly, the end of arm 43 moves behind the rim of can 41 to latch it within tray 25. Attention is called to the fact that the latch assembly, as aforedescribed, is a completely mechanical operation which takes place while the tray is in alignment with the gun bore. Such may become evident by reference to FIG. 17.

After the empty powder can 41 is latched into the tray, splined shaft 29 is made to rotate and pivot tray 25 into a position of alignment (see FIG. 2) with a case ejector, to be hereinafter described, for ejection of the spent cartridge from the gun system. This is brought about by means of an empty case tray drive means 53 shown in FIG. 15b. For a more detailed showing of means 53, reference should be made to FIG. 19 in which a pinion gear 54 is shown at one end of spline 29, and in mating engagement with an empty case tray piston 55. The piston 55 is double-headed and has an integral gear rack 56 between heads. Piston 55 is disposed within a cylinder 55' having a decelerate orifice and a check valve at each end.

As pinion gear 54 meshes with gear rack 56, linear motion of piston 55 is converted into a rotary motion of shaft 29, for a raising and lowering of the tray 25. Piston 55 is latched at the end of its travel in either direction by means of latches 57, 57', thereby locking the empty case tray in either a raised or lowered position.

Turning now to FIG. 15a, the means for initiating movement of piston 55 is shown wherein an interlock valve 58, with a roller at one end and a switch at the other, is resiliently urged toward the side of gun barrel 22. A cam plate 60 is suitably positioned on the barrel such that, it will be contacted by the roller, as shown, when the gun has returned to within one inch of its battery position. When the tray 25 is in axial alignment with the gun bore, as in FIG. 1, and, when the gun has returned to within one inch of its battery position, valve 58 is moved away from the gun barrel and hydraulic pressure is thereby ported, through line A, to a solenoid valve 61, also see FIG. 15a. The aforementioned switch is also actuated upon valve 58 movement whereupon, an electric circuit is closed and solenoid 62 is energized to "RAISE." Valve 61 is thereby moved and pressure is ported, through line B, to latch valve 63, shown in FIG. 20, associated with a case ejected drive to be hereinafter described. At this point, the empty case ejector pawl 82 will be retracted and latched, allowing a continued porting of pressure through valve 63, via B', to the empty case tray latch valve 64, shown in FIG. 19. Valve 64 is linked to one end of a pivotable yoke 65 having linked to its other end, the latch 57. Inward movement of valve 64 will therefore retract latch 57, withdrawing it clear of piston detent notch 66 in 55. Thereupon, oil pressure, which had previously been locked by one of the lands of valve 64, is ported through the check valve to the other end of cylinder 55', driving it to "RAISE," and thereby raising stray 25 through a rotation of spline 29. As piston 55 completes its stroke, latch 57', controlled by latch valve 64' via yoke 65', drops, by spring force given to valve 64', into the detent notch 66' in piston 55, thereby maintaining the empty case tray in its raised position. As valve 64' shifts its position, a switch at its other end is actuated, thereby completing the electrical circuit to the solenoid assembly of FIG. 15a. Solenoid valve 61 returns to its neutral position as pressure is ported thereto, via C, and pressure to the empty case tray hydraulic circuits is cut off.

To lower the empty case tray, a hydraulic circuit must be completed to solenoid valve 61 through an interlock valve, not shown, which is shifted when the aforementioned cradle-ramming tray has moved down far enough so that it is clear of the slide assembly 21. Such a cradle interlock valve may then actuate a switch which will complete the electric circuit. Also, the hydraulic circuit must be completed to valve 61 through interlock valve 58, which is shifted when the gun housing approaches its battery position to within one inch thereof, in the same manner as regards the raising of the tray 25. Valve 58 will then actuate its associated switch to complete the electric circuit. The case tray can then be lowered without interference, whereupon, solenoid 67, FIG. 15a, is energized and valve 61 is shifted, thereby porting pressure, via line C, to the end of latch valve 64' shown in FIG. 19. As valve 64' shifts inwardly, latch 57' is withdrawn from notch 66', thereby unlatching piston 55. Oil pressure, which previously had been blocked by one of the lands of latch valve 64', is ported, through the check valve, to the opposite end of cylinder 55, driving it to "LOWER" and thereby lowering tray 25 through a rotation of spline 29. As the piston 55 completes its stroke, latch 57 drops, by spring force given to valve 64, into notch 66 thereby maintaining the empty case tray in its lowered position. The electrical circuit, through a switch at one end of valve 64, is also completed to the solenoid assembly when valve 64 shifts outward. This allows solenoid valve 61, via pressure through lines B, B', to return to its neutral position and cut off pressure to the empty case tray circuits.

The orifices at each end of cylinder 15' decelerate piston 55 as it approaches the end of its stroke. Check valves, respectively associated with these orifices, as shown, are seated so as to force discharge oil from cylinder 55', to by-pass through the decelerate orifices, and are unseated so as to allow incoming oil to by-pass the decelerate orifices.

Figure 19:
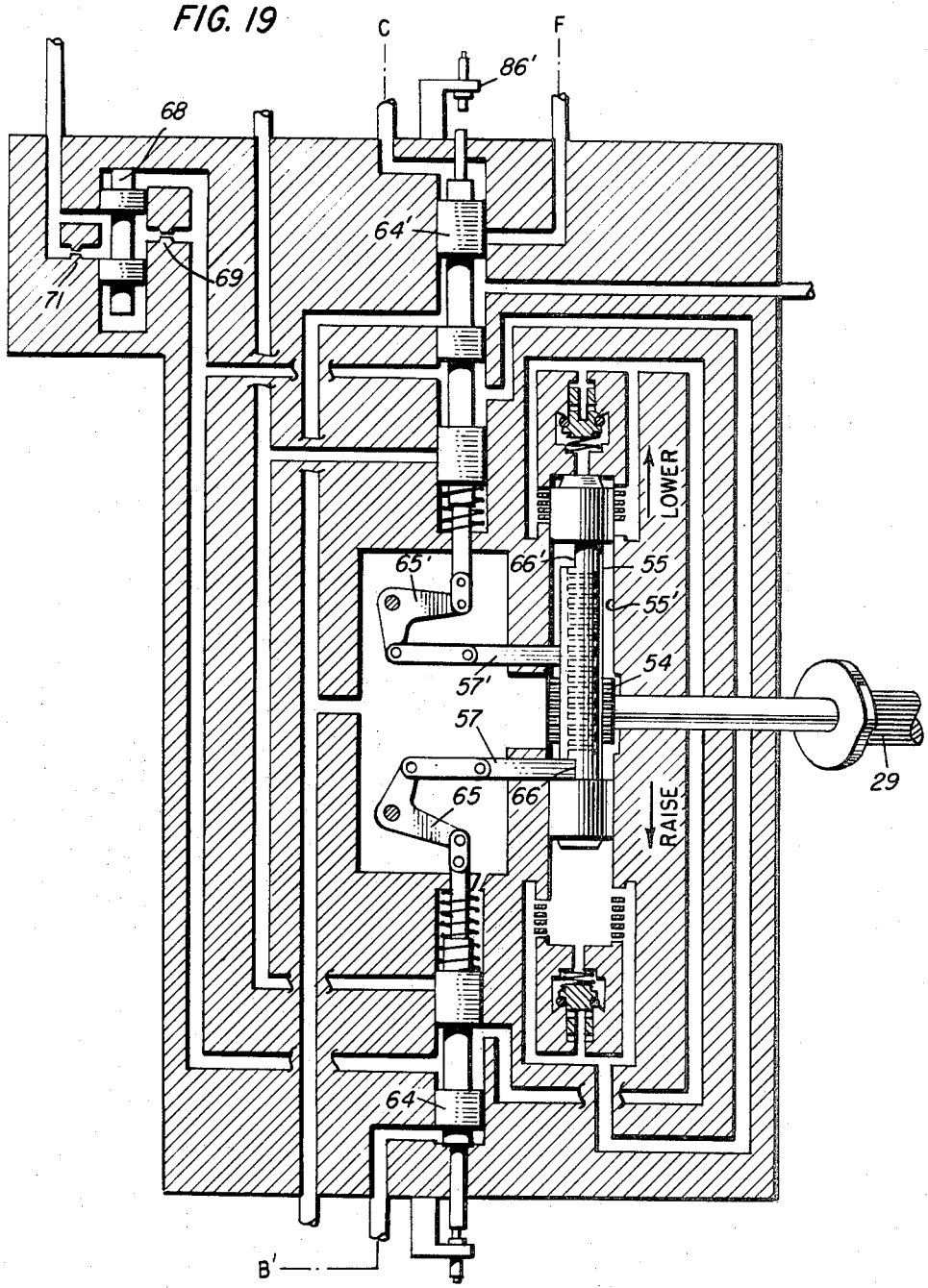
FIG. 19 is an hydraulic schematic showing of the empty case tray "RAISE" and "LOWER" mechanism.

Latch valves 64, 64', besides causing latches 57, 57' to retract, also serve to port the discharge oil from piston 55 to metering valve 68, FIG. 19, which controls the flow of oil discharged by movement of piston 55, in order to limit the maximum velocity of the empty case tray. Such is achieved by valve 68 sensing the pressure drop across control orifice 69 and varying the oil flow to limit the pressure drop across orifice 69 to a predetermined value.

Auxiliary orifice 71 is used to stabilize the operation of metering valve 68.

In the above manner, the empty case tray is lowered into latching engagement with the gun housing.

Figure 20:
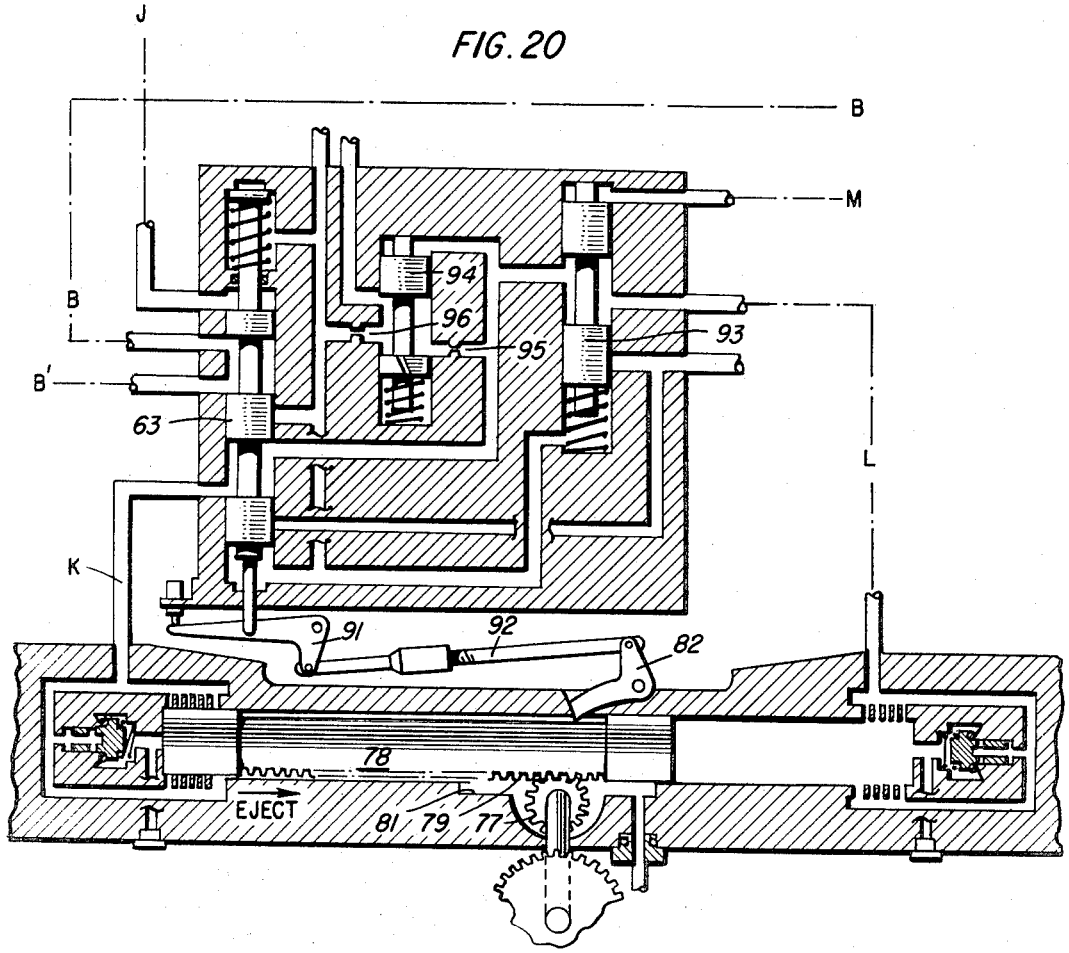
FIG. 20 is an hydraulic schematic showing of the case ejector drive mechanism.

Regarding the case ejector drive, FIGS. 15b and 20, after the empty case tray 25 has been rotated to a position above slide assembly 21, the empty powder can is in a position for ejectment from the gun mount. This is accomplished by means of a sprocket wheel 72 in driving engagement with a sprocket chain 73 having a pawl 74 thereon, which engages the aft end of a power can, and which drives it through an elongated conduit or chute 75. A receiving end of chute 75, see FIG. 1, aligns with one end of empty case tray 25 while its other or discharge end extends through shield 24. Once the aft end of the empty powder can is engaged by pawl 74, it is driven forwardly out through door assembly 80, FIG. 15a, in one continuous sweep. The tray 25 is grooved as at 25A, FIG. 8, in order that pawl 74 may slide therethrough.

The chute 75 is secured to the top of slide assembly 21 and is curved at its outer end in order that the empty ammunition cans 41 may be dispelled away from the vicinity of the gun barrel. Pawl 74, FIGS. 10 and 11, has a flat end 74a adapted to engage the end of shell case 41. Chain 73, approximately eleven feet long, is supported in suitable guiding tracks 76 secured to the top of slide assembly 21. Sprocket 72 is driven by pinion gear 77 through a series of suitable intermeshed gears. Gear 77 communicates with an integral gear rack 70 provided between the ends of a double-headed piston 78 disposed within a cylinder 81. Cylinder 81 also contains decelerate orifices and check valves at either end thereof. Gear 77, and in turn wheel 72, is driven by rack 79 so as to move chain 73, for ejection of the empty powder can 41. Piston 78 is latched when it returns after release by means of a latch 82, to be hereinafter described.

When empty case tray 25 is up and in alignment with chute 75 for powder can ejectment, an interlock valve 83, FIG. 15b, is shifted whereupon oil is ported through line D to a cradle response gear shifter, not shown, which activates the aforemetnioned cradle-ramming tray. The shifting of valve 83 causes a switch, mounted at one end thereof, to close thereby indicating that the empty case tray 25 is clear for cradle raise. A cam disc 84, mounted on splined shaft 29, produce the above-mentioned shift of valve 83 as shaft 29 is rotated to its "RAISE" position.

Operation of the case ejection means is as follows: When the empty case tray reaches the raised position, latch 57, FIG. 19, extends into the notch 66'. Valve 64', which is connected to the latch closes the contacts on switch 86'. This switch then energizes solenoid 86, FIG. 15A to extend. Oil is then ported, via line F, to the top land of latch valve 64', see FIG. 19, to insure that the empty case tray is latched in the ejection position. If the empty case tray is latched up, the oil ported to 64' via line F is not blocked by the valve land but flows to the empty case tray latch piston 87, FIG. 15a, via line F and shifts valve 83. Empty powder can 41 is thereupon released from a latched, up position of FIGS. 18 and 9. The end of arm 43 is made to disengage from behind the rim of can 41 as piston 87 is pushed outwardly thereby pivoting a button 88, see FIG. 9, against bracket 45 such that the end of arm 43, FIGS. 12–14, will pivot out of engagement with the powder can rim. Oil is then ported, through the latch assembly 42, via line H, to the door operating piston 89, FIG. 15a, for opening door assembly 80 as piston 89 moves outwardly. Upon movement of piston 89, oil is ported via line J to the top land of latch valve 63, FIG. 20, for releasing case ejector drive piston 78 so as to effect a movement of chain 73 for ejection of the spent can from the gun system. Latch valve 63, when extended, releases piston 78 through a fixedly pivoted yoke 91 hinged near one end to valve 63 and hinged at its other end to an adjustable bar 92 which, in turn, hinges to a movable latch member or pawl 82.

Movement of valve 63 also acts to port oil, via line K, to unseat a check valve at one end of drive piston 78, thereby by-passing the associated decelerate orifices, and moving piston 78 to its "EJECT" position.

A directional valve 93 directs the piston 78 discharge oil flow through its opposite end decelerate orifices, via line L, to metering valve 94, as piston 78 moves to its "EJECT" position. Valve 94 controls the flow of discharge oil to thereby limit its maximum velocity. This is accomplished by valve 94 sensing the pressure drop across control orifice 95 and varying the oil flow through its triangular-shaped slot to limit the pressure drop across the orifice to a predetermined valve. Orifice 96 is an auxiliary orifice used to stabilize the operation of valve 94.

Chain 73 is provided with a cam 97, see FIG. 15b, near its end, such that, as the chain approaches the end of its travel, it will contact a switch 98 which will de-energize the "EXTEND" circuit and complete the "RETRACT" circuit. For the retract stroke of piston 78, oil is ported via line M to the top land of valve 93 which draws the valve inwardly and ports oil through the piston 78 check valve at its "EJECT" end, which is unseated, to allow the incoming oil to by-pass the associated decelerate orifices. Piston 78 is thereby returned to its initial position thereby retracting chain 73. Door assembly 80 is simultaneously closed as oil is ported via line M to withdraw valve 89. A switch, mounted on the door operating linkage, indicates when the door is closed and locked. The door is thus only open when the empty powder can 41 is to be discharged. The door is designed to prevent splashing of water into chute 75 during a heavy sea or other weather conditions. A switch near yoke 91, FIG. 20, is signalled upon retract of piston 78 and indicates, along with the door operating switch, that the ejection cycle is completed, thereby allowing the solenoid valve 85 to return to its neutral position.

From the above description, it is apparent that an empty case ejector mechanism has been designed which is fully automatic and which is capable of dispensing each empty ammunition case out of the gun mount in one continuous movement. Also, the instant invention is completely operational for both high and low velocity projectiles without any necessary adjustment or refinement.

In brief, the operation of the empty case ejector mechanism is as follows: During the firing operation of the gun, and after the crade-ramming tray has loaded the gun and has cleared the breech block, suitable hydraulic and electric interlocks allow the empty case tray to be pivoted into alinement with the gun bore in latching engagement with the aft face of the gun housing, such that, during recoil and counter-recoil of the gun, the tray will move with the gun on a splined shaft and will receive the spent powder can. A buffering device mounted on the tray bears the brunt of empty case extraction. As part of a latch assembly mounted on the empty case tray, a decelerating arm retards the can's motion upon extraction, and a latch arm resiliently engages itself behind the rim of the powder can, thereby locking it within the tray. When the gun returns to within one inch of battery, a hydraulic and electric interlock, in contact with the gun housing, causes pressure to be ported through a solenoid valve, to an empty case tray drive piston which, when displaced, pivots the empty case tray into alignment with an empty case ejector. Raising of the tray is effected by means of a rack and pinion, the rack being integrally disposed between the heads of the drive piston, and the pinion being mounted on the end of the splined shaft. The linear motion of the drive piston is thereby converted to rotary motion. When the tray is in its raised position, pressure from the breech block "RAISE" interlock valve, not shown, is ported to valve 83 through line E and then to the cradle response gear shifter piston through line D. Interlock valve 83 in conjunction with the breech block interlock valve prevents the cradle from raising to the ram position unless the breech block and empty case tray are clear. Simultaneously, when the empty case tray reaches its raised position, latch 57' drops into the slot 66' in the piston 55. This energizes solenoid 86, FIG. 15a, through the switch 86' on the end of valve 64', FIG. 19. Pressure is then ported through line F from valve 85, FIG. 15a, via valve 64', FIG. 19, to the empty case tray latch assembly 87 releasing the latch arm from the powder can rim; thence to the ejector chute door operating piston 89 and finally to the latch valve 63, FIG. 20, of the empty case ejector drive for ejecting the empty powder can. Ejection is achieved by actuating a chain mounted on top of the slide assembly and having a pawl thereon which engages the aft portion of the powder can. A rack, integrally disposed between piston heads of an ejector drive piston, is released via the case ejector latch valve, thereby driving its associated pinion gear and ultimately a sprocket wheel, which actuates the chain. After ejection, the cradle will have completed its ramming operation and will be appropriately lowered. Upon lowering, a hydraulic and electric interlock in contact with the cradle, causes pressure to be ported to the solenoid valve for the lowering of the empty case tray. Simultaneously therewith, the same hydraulic and electric interlock which commenced raising of the tray, also causes pressure to be ported to the solenoid valve when the gun is again within one inch of the battery. The solenoid valve ports pressure to the case tray latch valve which unlatches the empty case tray drive piston which lowers the tray in the same manner as it was raised. The entire operation is repeated after the tray is latched to the aft face of the gun housing.

Obviously many modifications and variations of the present invention are possible in the light of the above teachings. It is therefore to be understood that within the scope of the appended claims the invention may be practiced otherwise than as specifically described.

What is claimed is:

1. In combination with an automatic gun system having a gun barrel, a gun barrel housing, a gun mount shield through which said barrel extends, and an empty case ejection means for conveying empty powder cans from said gun barrel to a position exterior of said shield, said ejection means comprising:

an elongated chute, horizontally disposed in a plane above said gun barrel, said chute having a receiving end and a discharge end, said discharge and extending to the outside of said shield;

an empty case tray pivotally mounted on said gun barrel housing for conveying the empty powder cans, upon extraction from said gun barrel, to a position in axial alignment with said chute receiving end;

buffering means comprising a housing, a piston within said housing and a crossbar extending across the aft end of said tray, said crossbar being hingedly secured at one end to said tray and at its other end to said piston, whereby, said buffering means acts to bear the brunt of the can as it strikes said crossbar.

2. In combination with an automatic gun system having a gun barrel, a gun barrel housing, a gun mount shield through which said barrel extends, and an empty case ejection means for conveying empty powder cans from said gun barrel to a position exterior of said shield, said ejection means comprising:

an elongated chute, horizontally disposed in a plane above said gun barrel, said chute having a receiving end and a dicharge end, said discharge end extending to the outside of said shield;

an empty case tray pivotally mounted on said gun barrel housing for conveying the empty powder cans, upon extraction from said gun barrel, to a position in axial alignment with said chute receiving end;

buffering means on said tray for dampening the empty powder can upon entry into said tray;

latch means on said tray for releasably securing the empty can within said tray;

an elongated chain disposed in the same horizontal plane as that of said chute, said chain having a pawl thereon for engaging the aft end of the empty can; and means for actuating said chain to eject the can from said tray, through said chute, and to the exterior of said gun mount shield, said ejection means being further characterized by a splined shaft to which said tray is slidably attached, said shaft being rotatably operable to pivot said tray into axial alignment with said chute receiving end from a position of axial alignment with the bore of said gun barrel.

3. In the gun system of claim 2 wherein said tray has first lugs at its forward end, and wherein said gun barrel housing has second lugs at its aft end releasably engageable with said first lugs when said tray is in axial alignment with said gun bore, whereby, said tray may recoil and counter-recoil with said gun barrel along said splined shaft through said first and second lugs.

4. In the gun system of claim 2 wherein:
a first pinion gear is provided on said splined shaft, and
a case ejector drive means is provided for rotatably operating said shaft through said pinion gear, said drive means comprising:
a reciprocable first double-headed piston having a first gear rack between its heads, said first rack, when actuated, intermeshing with said first pinion gear for raising and lowering said tray.

5. In the gun system of claim 4 wherein latch bars are provided for maintaining said tray in its raised or lowered position.

6. In combination with an automatic gun system having a gun barrel, a gun barrel housing, a gun mount shield through which said barrel extends, and an empty case ejection means for conveying empty powder cans from said barrel to a position exterior of said shield, said ejection means comprising:
an elongated chute, horizontally disposed in a plane above said gun barrel, said chute having a receiving end and a discharge end, said discharge end extending to the outside of said shield;
an empty case tray pivotally mounted on said gun barrel housing for conveying the empty powder cans, upon extraction from said gun barrel, to a position in axial alignment with said chute receiving end;
buffering means on said tray for dampening the empty powder can upon entry into said tray;
latch means on said tray for releasably securing the empty can within said tray;
an elongated chain disposed in the same horizontal plane as that of said chute, said chain having a pawl thereon for engaging the aft end of the empty can; and
means for actuating said chain to eject the can from said tray, through said chute, and to the exterior of said gun mount shield, said chain actuating means comprising, a sprocket wheel in intermeshing engagement with said chain, a second pinion gear in engagement with said sprocket, and a second double-headed piston having a second gear rack between its heads, said second rack, when actuated, intermeshing with said second pinion gear which in turn drives said sprocket wheel for moving said chain to its eject and retract positions.

7. In the gun system of claim 6 wherein said tray is provided with a longitudinal elongated slot through which said pawl extends to engage the aft end of the empty can.

8. In the gun system of claim 6 wherein a pawl latch is provided for maintaining said chain in its eject or retract position.

References Cited

UNITED STATES PATENTS

| 2,823,587 | 2/1958 | Chadwick et al. | 89—47 X |
|---|---|---|---|
| 2,855,828 | 10/1958 | Girouard et al. | 89—45 |

SAMUEL FEINBERG, *Primary Examiner.*

STEPHEN C. BENTLEY, *Assistant Examiner.*

U.S. Cl. X.R.

89—45